United States Patent
Taratine et al.

(10) Patent No.: US 10,929,524 B2
(45) Date of Patent: *Feb. 23, 2021

(54) METHOD AND SYSTEM FOR VERIFYING AN ACCESS REQUEST

(71) Applicant: Visa Europe Limited, London (GB)

(72) Inventors: Boris Taratine, London (GB); Matthew Johnson, Bedfordshire (GB); Simon Peter Rust, Berkshire (GB); Andrew Warren Rounds, Gloucestershire (GB)

(73) Assignee: VISA EUROPE LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,098

(22) Filed: Mar. 18, 2019

(65) Prior Publication Data

US 2019/0213321 A1  Jul. 11, 2019

Related U.S. Application Data

(63) Continuation of application No. 14/639,850, filed on Mar. 5, 2015, now Pat. No. 10,282,541, which is a
(Continued)

(30) Foreign Application Priority Data

Sep. 6, 2012 (GB) .................................. 1215951
Dec. 7, 2012 (GB) .................................. 1222090

(51) Int. Cl.
*H04L 9/32* (2006.01)
*H04L 29/06* (2006.01)
(Continued)

(52) U.S. Cl.
CPC .............. *G06F 21/45* (2013.01); *G06F 21/31* (2013.01); *G06F 21/34* (2013.01);
(Continued)

(58) Field of Classification Search
None
See application file for complete search history.

(56) References Cited

U.S. PATENT DOCUMENTS

| 4,720,860 A | 1/1988 | Weiss |
| 4,998,279 A | 3/1991 | Weiss |

(Continued)

FOREIGN PATENT DOCUMENTS

| CN | 1838595 A | 9/2006 |
| CN | 101051908 A | 10/2007 |

(Continued)

OTHER PUBLICATIONS

Third Office Action, dated Aug. 10, 2018, in CN Application No. 201380057898X, 8 pages.
(Continued)

*Primary Examiner* — Alexander Lagor
(74) *Attorney, Agent, or Firm* — Kilpatrick Townsend & Stockton LLP (57) ABSTRACT

A system for verifying a request for access to data is provided, the system comprising a first module 20 and a second module 30. The first module 20 is arranged to generate a password, and the second module 30 is arranged to receive a password associated with a request for data, validate the received password, and enable access to the requested data. The system is such that the first and second modules 20, 30 share a secret that has been uniquely assigned thereto, the shared secret being for use in genera-
(Continued)

tion and validation of a said password. Furthermore, the first module 20 is communicatively disconnected from the second module 30.

21 Claims, 4 Drawing Sheets

Related U.S. Application Data continuation of application No. PCT/GB2013/052346, filed on Sep. 6, 2013.

(51) Int. Cl.
*H04L 9/00* (2006.01)
*G06F 21/00* (2013.01)
*G06F 21/45* (2013.01)
*G06Q 20/30* (2012.01)
*G06F 21/34* (2013.01)
*G06F 21/72* (2013.01)
*G06F 21/31* (2013.01)
*G06F 21/62* (2013.01)

(52) U.S. Cl.
CPC ........ *G06F 21/6245* (2013.01); *G06F 21/725* (2013.01); *G06Q 20/30* (2013.01); *H04L 63/083* (2013.01); *H04L 63/0846* (2013.01); *G06F 2221/2151* (2013.01)

(56) References Cited

U.S. PATENT DOCUMENTS

| | | | | |
|---|---|---|---|---|
| 5,361,062 | A * | 11/1994 | Weiss | G07C 9/21 340/5.26 |
| 5,367,572 | A | 11/1994 | Weiss | |
| 8,396,452 | B1 * | 3/2013 | Matsuoka | G06F 21/35 455/410 |
| 8,627,419 | B1 | 7/2014 | Vandemar | |
| 2005/0005114 | A1 | 1/2005 | Medwinsky | |
| 2005/0138357 | A1 | 6/2005 | Swenson | |
| 2005/0216763 | A1 * | 9/2005 | Lee | H04L 9/0877 726/22 |
| 2007/0250923 | A1 | 10/2007 | M'Raihi | |
| 2007/0266256 | A1 | 11/2007 | Shah et al. | |
| 2008/0022413 | A1 * | 1/2008 | Holtzman | G06F 21/6218 726/27 |
| 2008/0168543 | A1 | 7/2008 | von Krogh | |
| 2008/0168544 | A1 * | 7/2008 | von Krogh | H04L 63/102 726/6 |
| 2009/0013390 | A1 | 1/2009 | Li | |
| 2009/0193264 | A1 | 7/2009 | Fedronic | |
| 2009/0322766 | A1 | 12/2009 | Marien | |
| 2010/0107229 | A1 | 4/2010 | Najafi | |
| 2012/0084854 | A1 | 4/2012 | Mualem et al. | |
| 2012/0089519 | A1 | 4/2012 | Peddada | |
| 2013/0340071 | A1 | 12/2013 | Vellozo Luz | |
| 2014/0115341 | A1 | 4/2014 | Robertson | |
| 2014/0330726 | A1 * | 11/2014 | Ball | G06F 21/34 705/67 |
| 2015/0027097 | A1 | 9/2015 | Dietrich | |
| 2015/0270971 | A1 * | 9/2015 | Dietrich | G06F 21/602 713/168 |

FOREIGN PATENT DOCUMENTS

| | | |
|---|---|---|
| CN | 101204067 A | 6/2008 |
| CN | 102185838 A | 9/2011 |
| CN | 102368230 A | 3/2012 |
| EP | 1139200 A3 | 10/2001 |
| EP | 2296311 A1 | 3/2011 |
| WO | 2006040820 A1 | 4/2006 |
| WO | 2010127945 A1 | 11/2010 |

OTHER PUBLICATIONS

Nationwide, "Card Reader Security for Internet Banking." http://www.nationwide.co.uk/NR/rdonlyres/B5038E I 5-4C77-48E8-9B83-302044 7DFB5E/O/rca_illustrator_access 1v2.pdf.
Battlenet, "Battle.net Authenticator FAQ," Battle.net Support, Oct. 17, 2012. https://us.battle.net/support/en/ article/battle-net-au thenticator-faq.
Fadi Aloul et al., "Two Factor Authentication Using Mobile Phones" Computer Systems and Applications, IEEE/ACS International Conference on IEEE, Piscataway, NJ, May 10, 2009.
International Search Report and Written Opinion issued in corresponding PCT Application No. PCT/GB2013/052346 dated Dec. 2, 2013.
International Search Report and Written Opinion issued in corresponding PCT Application No. PCT/GB2013/052347 dated Dec. 2, 2013.

* cited by examiner

METHOD AND SYSTEM FOR VERIFYING AN ACCESS REQUEST

CROSS-REFERENCE TO RELATED APPLICATIONS

This application is a continuation of U.S. application Ser. No. 14/639,850, filed Mar. 5, 2015, which is a continuation of International Application No. PCT/GB2013/052346, filed Sep. 6, 2013, which claims the benefit of both UK Application No. GB 1215951.3, filed Sep. 6, 2012, and UK Application No. GB 1222090.1, filed Dec. 7, 2012, of which are all herein incorporated by reference.

BACKGROUND OF THE INVENTION

Field of the Invention

The present invention relates to a method and system for verifying an access request, and is particularly, but not exclusively suitable for verifying a request for access to data or services or assets.

Description of the Related Technology

The demand for access to confidential or user-specific data (or assets or services) is increasing. For example, providing access to a bank account and allowing the transfer of money from that account should be restricted to authorized users such as an account holder. Typically users are authenticated when requesting access to data by means of credentials that identify the person requesting access to the data. Remote access of data presents particular problems because the person requesting data, assets or services is typically in a different physical location to that of the party responding to the request. As a result it is very difficult for the party servicing the request to know whether the entity making the request is a) who they claim to be, b) entitled to use the device from where the request originates and c) is in possession of the device from where the request originates.

Typically, when an account is set up between a person and a party such as a data provider, the person will establish the aforementioned credentials for use by the data provider in identifying and authenticating the person for future requests. Such credentials may include information that uniquely identifies the parson (e.g. personally identifiable information (PII)) and a secret (e.g. a password) for use in verifying the identity of the person. It is now also common that the data provider will require the person to register themselves as the owner of a device used to access the data. The registered association between the device and the owner of the device can be used by the data provider as an additional validation factor. For example, in the case that a data provider receives a request for access to an account on behalf of a particular person from a particular device that is not the device registered for the person, the data provider may determine to trust that the request was made by the person registered for the account.

It can be relatively easy for a person wishing to access data from a data provider on behalf of another person who has an account with that data provider to obtain his user credentials (i.e. PII, User ID and password) by purchasing them from criminal shadow online markets and thereafter fraudulently access the other person's data. Additionally, it is possible to remotely access and control devices, and thereby request data on behalf of the registered owner of those devices. Often it is not possible to determine whether the request was made by a user who is in physical possession of the device or whether the request was made remotely by a user using another device to remotely control the device from which the request is made.

One-time passwords (OTP) are commonly used to alleviate these issues: an authentication server uniquely assigns an OTP generation key to the registered owner of a device, the OTP generation key being for use in generating and validating OTPs. An authentication server typically holds hundreds or thousands of OTP generation keys, each having been uniquely assigned to, or registered in respect of, a different person. The authentication server configures an OTP token in the possession of the registered owner with his assigned OTP generation key. These OTP tokens may, for example, use the OTP generation key to generate a different password each time a new password is requested by the registered user or as another example, may use the OTP generation key to generate new passwords at regular time intervals.

In order to access user-restricted data via a device, a user provides the OTP generated by the OTP token to the data provider along with the credentials that uniquely identify the owner of the device. Typically, the data provider will then identify the owner of the device and pass on the received OTP to the authentication server. The authentication server will look up the OTP generation key associated with the identified person and will use the key to determine whether the received OTP corresponds to the OTP that would have been/was generated by the OTP token held by the owner of the device. The authentication server will then indicate to the data provider whether the received OTP is valid. If the correct OTP was sent to the data provider, then it can be determined that the user of the device is in possession of the OTP token. However, authentication servers are vulnerable to compromise thereby facilitating the unauthorized distribution to other entities and enabling anyone with (illegitimate) access to a distributed OTP generation key to access data on behalf of the person associated with that key.

U.S. Pat. No. 7,721,107 discloses a particular method of verifying whether the user of a device is a human. In the described method a user of a device requesting access to an OTP is presented with "interaction instructions" via a first area of a user interface of the device. In one example, the user is instructed to enter a series of numbers into a second area of the user interface; in another example, the user is instructed to perform a physical action, such as tracing a curve within a second area of the user interface (e.g. a touch screen). The device then determines whether the user has entered the correct numbers/traced the correct curve etc., and, if so, the device provides the requested OTP to the user. However as the module presenting the interaction instructions and the module processing the user's response to the interaction instructions are communicatively connected, a user might be able to make a connection to the device and thereby be able to fraudulently authenticate himself to the device by accessing the interaction instructions and responding to them appropriately.

SUMMARY

According to a first aspect of the present invention, there is provided a system for use in verifying a request for access to data, the system comprising: a first module arranged to generate a password and output the generated password via an interface of the first module; a second module arranged to receive a password associated with the request for data, validate the received password, and enable access to the requested data, wherein said received password is received via an interface of the second module and corresponds to the password generated by the first module, wherein the first and second modules share a secret that has been uniquely assigned to the first and second modules for use in generation and validation of a said password, and, wherein the first module is communicatively disconnected from the second module.

The shared secret enables the second module to determine whether a password received from a user of the second module matches a password that has been generated by the first module, and thereby enables the second module to validate the received password. As this secret is uniquely assigned to the first and second modules (i.e. there is a one-to-one mapping between the secret and the module for generating the password and also a one-to one mapping between the secret and the module for validating the password), then in the event that the secret is compromised, only those two modules need to be reconfigured with a new secret. This is in contrast to the known OTP system described in the background section, in which a given OTP key is uniquely associated to a person, rather than to a pair of modules, and is held at an OTP validation server, which holds many different OTP keys for many different people. This results in a one-to-many relationship between the OTP validation server and the devices that use the OTP key to generate passwords. That being the case, if the OTP validation server is compromised, data can be accessed on behalf of a person whose key is held by the validation server via any device that uses that person's OTP key to control access to data, assets or services. As the OTP key will typically be stored both on a number of OTP tokens and also at the authentication server, establishing a new OTP key can be quite burdensome on the authentication server, as the authentication server is required both to reassign that person a new OTP generation key and to configure a new set of OTP tokens with the new OTP generation key.

Advantageously, said second module is arranged to validate passwords associated with a further module with which it has been paired during a configuration process in which a secret is assigned to the second module and the further module. The further module may be a module of a third party and in this case, the secret may be associated with a particular user who is known by the third party. The second module is therefore able to use the secret to verify whether the user of the second module is the user known by the third party.

In an arrangement, said first module and said second module are composite parts of a device. In this case, if a user of the second module is able to retrieve a password from the first module and enter it into the second module, it is very likely that the user of the second module is in possession of the first module, and is therefore also in possession of the second module. Thus, if the second module validates a password received from a user of the second module, it is very likely that that user is in possession of the second module. In other words, it is likely that the user of the device is not controlling the device remotely.

In one embodiment said first module said second module are integrated within the device. For example, the modules could share a battery.

In one arrangement, said device has a unique device identifier and said generated and received passwords are generated and validated in dependence upon the unique device identifier. This provides additional assurance that the user of the second module is in possession of the device.

Advantageously, said shared secret is stored in a secure element of the second module. This prevents a user of the second module accessing the secret used to validate received passwords in order to determine the password that would be generated by the first module.

In an embodiment, said shared secret is stored in a secure element of the first module. This prevents a user of the first module accessing the secret used to generate passwords.

In one arrangement, the second module is arranged to send data for use in enabling access to the requested data, whereby to enable access to the requested data. This is particularly useful in the case that the requested data is held externally by a third party, or in the specific case that the passwords are generated and validated in dependence upon the time, but the second module does not have a clock that is synchronized with the clock of a first module.

In an embodiment, the first module is arranged to generate said generated password in response to an input related to said request for access to data.

Advantageously, the first module is arranged to generate a subsequent password in response to a subsequent input related to a request for access to data, the subsequently generated password being different from a previously generated password. Thus, if a remote user observes (via an interface of the second module for example) a password entered by a user who is in possession of both the first and second modules, the remote user will not be able to reuse the observed password in order to access further data, as the validity of the password will have expired.

Alternatively, the first module is arranged to generate passwords at regular time intervals, each successively generated password being different from a previously generated password. In this case, a particular generated password is only valid for a predetermined time period, and therefore a remote user who has observed a password entered by a user who is in possession both the first and second modules will not be able to reuse that password outside of the predetermined time period.

In one arrangement, said passwords are generated and validated in dependence upon at least said shared secret and the current time.

In a particular arrangement, the first module comprises a first clock for use in generating a password and the second module comprises a second clock for use in validating a received password, the first and second clocks being synchronized.

In a different arrangement, the first module comprises a clock for use in generating a password and the second module is arranged to receive a timestamp for use in validating a received password, the timestamp being received from a third party that has a clock that is synchronized with the clock of the first module. This has the advantage that the second module is not required to have a clock synchronized with the first clock.

In a further alternative arrangement, the first module comprises a clock for use in generating a password and the second module is arranged to receive a timestamp for use in validating a received password, and said data sent by the second module for use in enabling access to data is sent to a third party that has a clock synchronized with the clock of the first module and comprises an indication of the timestamp used to validate said received password. This has the advantage that the second module is not required to have a clock synchronized with the first clock.

In one embodiment, said data sent by the second module for use in enabling access to data comprises data indicative of a determination that the received password is valid. The second module may comprise a user interface and be arranged to receive the request for access to data from a user of the second module via that user interface.

In one arrangement, the second module is further arranged to receive information via the user interface of the second module that uniquely identifies a human, and said data sent by the second module for use in enabling access to data comprises data that uniquely identifies said human.

According to a second aspect of the present invention, there is provided a method of verifying a request for access to data, the method comprising: generating at a first module a password and outputting the generated password via an interface of the first module; receiving at a second module a password associated with the request for data via an interface of the second module, said received secret corresponding to the password generated by the first module, validating at the second module said received password, and enabling access to the requested data at the second module, wherein the first and second modules share a secret that has been uniquely assigned to the first and second modules for use in generation and validation of a said password, and wherein the first module is communicatively disconnected from the second module.

According to a third aspect of the present invention, there is provided a system for use in verifying a request for data received at a device as a request originating from a human in possession of the device, the system comprising: a first module arranged to generate a password and output the generated password via an interface of the first module; a second module arranged to receive a password associated with the request for data and validate the received password, and to enable access to data, wherein said received password is received via an interface of the second module and corresponds to the password generated by the first module, wherein the first module and the second module are composite parts of the device, and wherein the first module is communicatively disconnected from the second module.

It will be appreciated that, as the first and second modules are communicatively disconnected from each other, if a user of the second module is able to retrieve the password generated by the first module, it is likely that the user of the second module is in possession of the first module. Further, if the first and second modules are composite parts of a single device, then if the user of the second module is in possession of the first module, then that user must also be in possession of the second module. When the password generated by the first module is displayed via a user interface of the first module and is received via a user interface of the second module, the second module is able to determine to a reasonable level of confidence that the request for access to data originated from a human who is in possession of the device. This is because, as the first module is communicatively disconnected from the second module, there is no means to automatically transfer the password generated by the first module to the second module and thus the password has to be read from a user interface of the first module and input manually via the user interface of the second module.

Conveniently, said first module and said second module are integrated within the device.

In one arrangement, the first and second modules share a secret for use in generation and validation of a said password. In this case, the second module may be able to determine whether a password received from a user of the second module matches a password that was/would have been generated by the first module without having to use a third party.

In an alternative arrangement, the second module is arranged to send the received password to a third party and to receive an indication from the third party that the received password is valid, whereby to validate the received password. In this case, the second module is not required to be configured with a secret.

In a further alternative arrangement, the second module is arranged to validate the received password by comparing the received password to a password generated by a third module.

In one embodiment, the first module is arranged to generate said password in response to an input related to said request for access to data.

Advantageously, the first module is arranged to generate a subsequent password in response to a subsequent input related to a request for access to data, the subsequently generated password being different from a previously generated password.

In an alternative embodiment, the first module is arranged to generate passwords at regular time intervals, each successively generated password being different from a previously generated password.

According to a fourth aspect of the present invention, there is provided a method of verifying a request for data received at a device as a request originating from a human in possession of the device, the method comprising: generating at a first module a password and outputting the generated password via an interface of the first module; receiving at a second module a password associated with the request for data via an interface of the second module, said received secret corresponding to the password generated by the first module; validating at the second module the received password; and enabling access to data at the second module, wherein the first module and the second module are composite parts of the device, and wherein the first module is communicatively disconnected from the second module.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
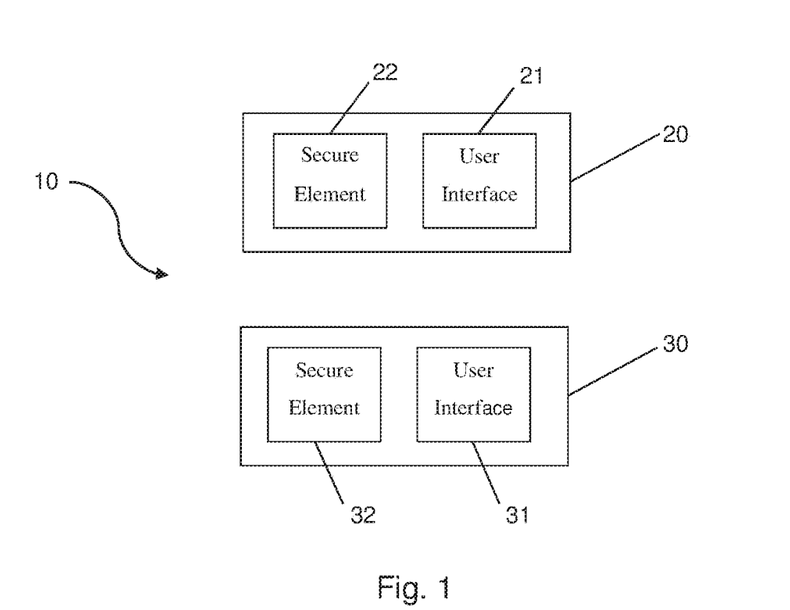
FIG. 1 shows a block diagram of a system according to one or more embodiments of the present invention.

Embodiments of the invention are concerned with determining whether to enable access to requested data, assets or services. FIG. 1 shows a block diagram of a system 10 according to an embodiment of the present invention. The system 10 comprises a first module 20 and a second module 30. The first module 20 is arranged to generate passwords, and the second module 30 is arranged to receive passwords from a user of the system 10 and validate the received passwords. While not essential, in one embodiment, the first and second modules 20,30 each comprise a respective user interface 21,31. User interfaces 21,31 typically comprise at least one input or output. An input of a user interface of a device may be, for example, a keyboard, a mouse, a touch screen, a microphone or any other component that allows the user to provide an input to the device. An output of a user interface of a device may be, for example, a screen, a speaker, or any other component capable of outputting information from the device to a user of the user interface. The user interface 21 of the first module 20 is configured to provide a generated password to a user of the first module 20 and the user interface 31 of the second module 30 is configured to receive a password from a user of the second module 30. In the present embodiment, the first module 20 and the second module 30 are separate devices that are collectively configured to determine whether it is likely that a request for access to data originated from a user in possession of the second module 30. As an example, the two modules 20,30 may be manufactured and sold together, and in the possession of a particular person. The second module 30 may, in one example, be a wireless device (or a component of a wireless device). In one arrangement, the first and second modules 20, 30 may be components of a single wireless device.

The second module 30 may operate under the control of a user who is in possession of the second module 30 via the user interface 31 of the second module 30 or may operate under the control of a remote entity having a communications link to the second module 30. The first module 20 can be controlled via the user interface 21 of the first module 20 and is communicatively disconnected from the second module 30, as will be described in more detail below, and therefore cannot be controlled via the user interface 31 of the second module 31.

The second module 30 may be a composite part of a device that stores confidential data associated with a particular person only. As a particular example, the second module 30 may store user-restricted cryptographic keys for decrypting data. Additionally or alternatively, the second module 30 may provide or facilitate access to confidential data that is stored externally by a third party. In this latter case, the third party may only allow access to the data if it is determined that the data is being provided to a particular person (in other words, the data may be user-restricted). As discussed above, before a third party will grant access to user-restricted data via a particular device, the third party may require that the owner of a device registers an association between the device and the owner. In this case, the third party may then only send data, which is intended to be received by a particular person, to the device that is associated with that person. In the present example, the second module 30 may have a registered association with a particular person, and thus access to data that is intended for the owner of the second module 30 can be accessed via the second module 30 only.

When the second module 30 comprises a communications module, it will be appreciated that an unauthorized person could make a connection to the second module 30 and remotely control the second module 30 to send a request to the third party holding the confidential data. If the second module 30 can determine that the request for access to data was made by a user in possession of the second module 30 or by a user remote from the second module 30, it can take an appropriate responsive action e.g. disallow further use of the second module 30 upon a determination that the request was made by a remote user.

As will now be explained, embodiments provide a means of performing such a determination. The first and second modules 20, 30 are configured with a shared secret that is for use in both generating passwords and validating passwords. In particular, the first module 20 comprises circuitry and/or software that is constructed and configured to generate a password based on the secret, and the second module 30 comprises circuitry and/or software that is constructed and configured to determine, based on the secret, whether a password received from a user of the second module 30 matches the password that was generated by the first module 20. In the particular embodiment shown in FIG. 1, this secret is uniquely assigned to the first and second modules 20, 30. In other words, the secret is associated with the first and second modules 20, 30 only. In one arrangement, the first and second modules 20, 30 are tamper-resistant, i.e. the secret stored in the first and second modules 20, 30 and the algorithm used to generate the password cannot be altered.

In the present embodiment, the system 10 is configured such that the first module 20 is communicatively disconnected from the second module 30. In other words, the system 10 is constructed and configured such that there are no means of communicating (either directly or indirectly) between the two modules 20, 30. In one particular embodiment, communication between the two modules 20, 30 is prevented by the modules 20, 30 being physically disconnected from each other. It will be understood however, that the two modules 20,30 could be physically connected (i.e. integrated) whilst being communicatively disconnected e.g. if they do not share any common circuitry or system interfaces or comprise any other means of exchanging information with each other.

Figure 2:
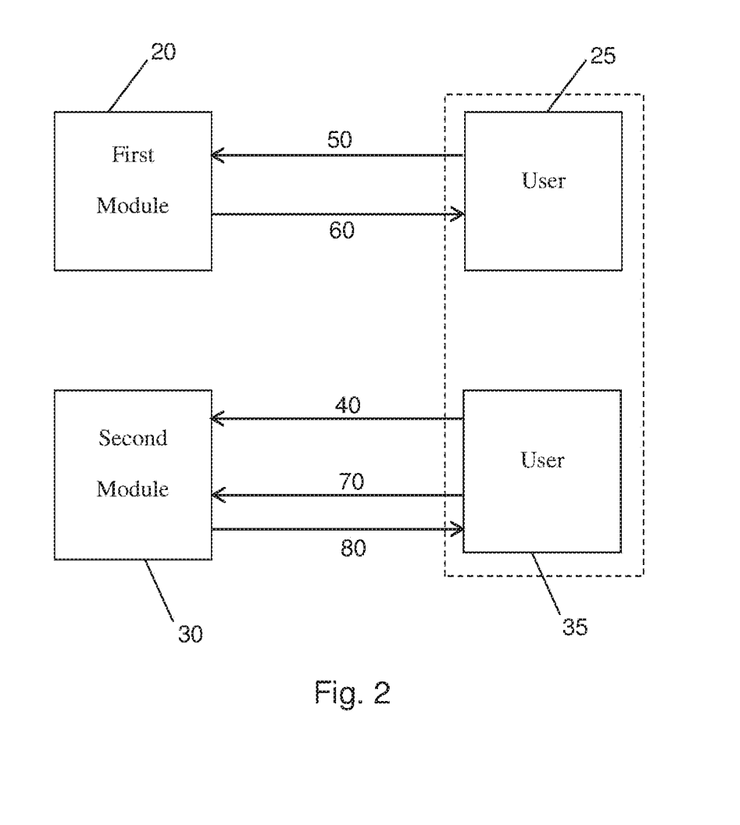
FIG. 2 shows schematically a method according to one or more embodiments of the present invention.

FIG. 2 shows schematically an exemplary method according to the present embodiment. In this method, a user 35 of the second module 30 makes a request for access to data (step 40). The request for access to data at step 40 could be, for example, a request for access to a user-restricted webpage, a request for access to confidential information, or a request for access to data for use in enabling access to a service. It will be understood that, in general, the data that the user 35 of the second module 30 wishes to access could be data stored on or generated by a component of the system 10, or could be data that is stored at or generated by an entity that is external to the system 10 (for example an external database or server). The data that the user 35 of the second module 30 wishes to access may be, for example, a restricted webpage hosted on a server, which is external to the system 10, and in this case, access to the webpage may be enabled by the server sending data to the second module 30. The information contained in the data sent by the second module 30 will be explained in more detail below.

In response to the request for access to data at step 40, the second module 30 prompts the user to enter a password that has been generated by the first module 20. In this example, the user 35 of the second module 30 is also the user 25 of the first module 20 (as shown schematically by the dashed lines in FIG. 2) and thus the user can then cause (step 50) the first module 20 to generate a password by, for example, pressing a button of the user interface 21 of the first module or otherwise indicating to the first module 20 that a password is required.

In response, the first module 20 uses the secret that is uniquely assigned to the first and second modules 20, 30 to generate a password, which is then provided (step 60) to the user 25 of the first module 20. The generated password may be, for example, a series of numbers, a series of letters, a combination of letters and characters or an image and may for example be presented to the user 25 of the first module 20 on a screen of the user interface 21.

Alternatively, the first module 20 may generate passwords (in dependence on the shared secret) at regular time intervals and may automatically present the most recently generated password on the user interface 21 of the first module 20.

In either case, as the user 35 of the second module 30 is the user 25 of the first module 20, the user can then enter (step 70) the password generated by the first module 20 into the user interface 31 of the second module 30. The second module 30 then uses the secret that is uniquely assigned to the first and second modules 20, 30 to verify whether the password received from the user 35 of the second module 30 is the same as the password that was generated by the first module 20. Upon validating the received password, the second module 30 then enables access to the requested data (step 80).

It will be appreciated that when a password that is generated by the first module 20 is entered into the second module 30, the password must have been previously retrieved from the first module 20. As the first module 20 is communicatively disconnected from the second module 30, it is highly likely that user 35 is a human who is in possession of the first module 20 as well as the second module 30, and is therefore able to retrieve the password from the first module 20 and enter it manually into the second module 30.

Advantageously, the first module 20 and the second module 30 may each comprise a respective secure element 22, 32 such as a secure SIM card or a secure memory card, and the secret that is uniquely assigned to the first and second modules 20, 30 is stored in the secure elements 22, 32 of the first and second modules 20, 30. In other words, the secret that is uniquely assigned to the first and second modules 20, 30 is stored in parts of the first and second modules 20, 30 that cannot be accessed by users 25, 35 of those modules 20, 30. In this case, the secret may be provisioned to the secure elements 22, 32 of the first and second modules 20, 30 at manufacture and in a preferred embodiment, the secure elements 22, 32 are manufactured separately to the other components of the modules 20, 30 and thus the association between the modules 20, 30 and the secret stored on the secure elements 22, 32 cannot be known by any entity external to the system 10. Storing the secret within secure elements 22, 32 prevents a user 25, 35 on either of the modules 20, 30 from finding out the secret and thereby being able to work out the password that needs to be entered into the second module 30 in order to access the requested data and also prevents a user 25, 35 from altering the algorithm for generating passwords, which could thereby cause the first module 20 to generate a false response.

One particular advantage of the present embodiment arises from the fact that the secret for generating and validating the password is uniquely assigned to the first and second modules 20, 30. More specifically, because there is a one-to-one mapping between the secret and the module 30 that uses the secret to validate the password, and also a one-to-one mapping between the secret and the module 20 that uses the secret to generate the password, then in the event that the secret is compromised, the modules 20, 30 need only to be reconfigured with a new secret (that is again uniquely assigned to the modules 20, 30). This can be achieved, for example, by replacing the secure elements 22, 32 of the modules 20, 30 with new secure elements that have the new secret stored thereon. This is in contrast to the known OTP system described in the background section, in which a given OTP key is uniquely associated to a particular user rather than to a pair of modules 20, 30. In this known system, there can be a one-to-many relationship between the OTP key and the devices that use the OTP key to generate a password. That being the case, if an OTP key is compromised, data can be accessed on behalf of that user via any device that uses the OTP key. As the OTP key will typically be stored both on a number of OTP tokens and also at the authentication server, establishing a new OTP key can be quite burdensome on the authentication server, as the authentication server is required both to reassign a new OTP generation key to that user and to configure a new set of OTP tokens with the new OTP generation key.

In one arrangement, the second module 30 is also paired with a further module, such as a module of a third party, and is arranged to validate passwords associated with that further module. In this case, the second module 30 may have been paired with the further module during a configuration process in which a secret is assigned to both the second module 30 and the further module. It will be understood that, in general, the second module 30 could be paired with any number of further modules.

As described above, in the embodiment shown in FIG. 1, in which the two modules 20, 30 are separate devices, it is possible that a remote user of the second module 30, who is not the registered owner of the second module 30, but has established a communication link with the second module 30 and is thereby controlling the second module 30 remotely, is in possession of the first module 20. For example, the remote user may have stolen the first module 20. The remote user could request access to data via the communication link and then retrieve a password generated by the first module 20 and enter this into the second module 30 via the communication link. In this case, the second module 30 would validate the request for access to data and would enable the remote user to access the data. In other words, a remote user in possession of the first module 20 would be indistinguishable from a registered user of the second module 30 who is in possession of both the first and second modules 20, 30 because the remote user will be able to retrieve the password from the first module 20 and enter it into the second module 30.

Figure 3:
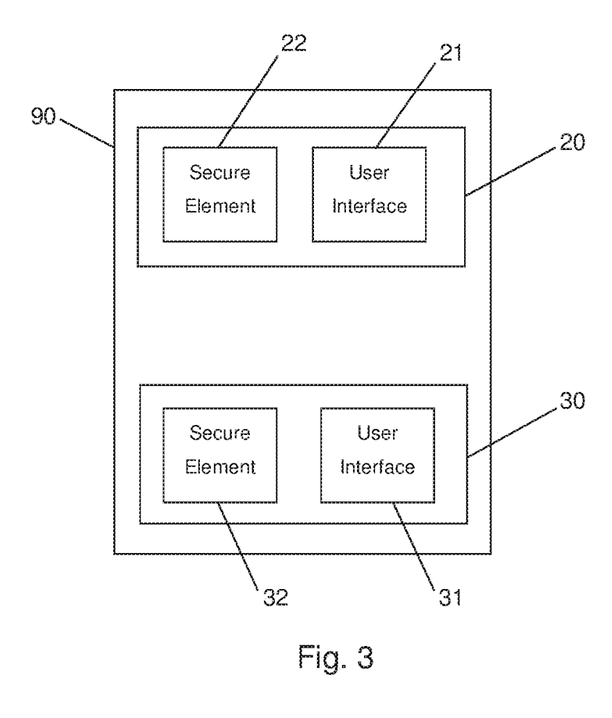
FIG. 3 shows a block diagram of a system according to one or more embodiments of the present invention.

FIG. 3 shows a block diagram of a particular embodiment that addresses this scenario. In this arrangement the first and second modules 20, 30 are composite parts of a single device 90. The modules 20, 30 may be physically separate within the device 90, or the modules 20, 30 may be physically connected (i.e. integrated) within the device 90. Advantageously, they may share some components within the device 90, such as the power source (not shown). In any case, the first and second modules 20, 30 are communicatively disconnected with respect to each other within the device 90. As will be appreciated, when the first and second modules 20, 30 are composite parts of a single device 90, if a user 35 of the second module 30 is in possession of the first module 20 (and can therefore retrieve 60 the password generated by the first module 20), that user must also be in possession of the second module 30. When the password generated by the first module 20 is displayed via the user interface 21, then when the first and second modules 20, 30 are composite parts of a single device, the second module 30 can determine to a greater level of confidence whether the request for access to data 40 originated from a user who is in possession of the device 90. This is because, as there are no means of communicating (either directly or indirectly) between the first and second modules 20, 30, there is no means to automatically or remotely transfer the password generated by the first module 20 to the second module 30 and thus the password has to be physically retrieved from the user interface 21 and input manually via the user interface 31 of the second module 30.

In one arrangement, the secret that is uniquely assigned to the first and second modules 20, 30 is an OTP generation key and the password that is generated by the first module 20 is thus a one-time password (OTP). In this embodiment, subsequent passwords generated by the first module 20 are different from the previously generated passwords, and each generated password is valid for one authentication attempt only.

In one particular arrangement, the generated OTP is time-dependent and is valid for a predetermined period of time. In an alternative arrangement, the first module 20 may generate a password in dependence upon a previously generated password and an OTP generation key.

In a particular embodiment of the present invention, the first module 20 comprises a clock and the OTP is generated in dependence upon the current time (i.e. the time at which the OTP is being generated as measured by the clock of the first module) and the OTP generation key. The OTP may be a cryptographic function of the OTP generation key and the current time. In the case that the first module 20 and the second module 30 are composite parts of a device 90, the OTP may additionally be generated in dependence on a device ID uniquely associated with the device 90. Such a device ID may be, for example, a hashed function of the CPU ID of the device 90, a hashed function of a GPU ID of the device 90, or a combination thereof. In this case, the OTP may be a cryptographic function of the OTP generation key, the device ID and the current time. The current time will be known herein as the "generation time" TG, and it will be understood to have been measured with respect to the clock of the first module 20. In this case, a particular generated OTP can only be used to validate a request for access to data if used within a predetermined period of time following the generation time TG.

In one arrangement, the second module 30 may comprise a second clock that is synchronized with the clock of the first module 20 (i.e. the "first clock"). As the second module 30 is tamper-proof, the second clock cannot be altered, and thus the second module 30 can trust that the second clock is synchronized with the first clock.

Upon receiving a password from a user 35 of the second module, the second module 30 uses the second clock and the OTP generation key to determine whether the password received 70 from the user 35 of the second module 30 is the same as a password that was/would have been generated by the first module 20 at a time within a predetermined time from the time at which the password was received 70 by the second module 30. The time at which the password was received 70 by the second module 30 will be known herein as the "reception time" TR.

The method used by the second module 30 to validate the received password will depend on the method used by the first module 20 to generate the password. Many such methods are already known and the specific method is considered to be outside the scope of the present invention.

If the second module 30 determines that the received password matches an OTP that was/would have been generated by the second module 30 at a time TG that is within a predetermined period of the reception time TR, then the second module 30 validates the received password, and may thus determine that it is likely that the request for access to data originated from a user who is in possession of the first module 20 (and is therefore unlikely to be in remote control of the second module 30). In the case that the requested data is stored on the second module 30 (or a device of which the second module is a component), the second module 30 then enables access (step 80) to the requested data. Alternatively, the second module 30 may be configured to only allow a particular person (or a number of particular people) to access the data, and in this case, the second module 30 may require that the user 35 of the second module 30 enters credentials (e.g. a username and password or a PIN) associated with that particular person into the second module 30 before access to the requested data is granted. As a particular example, the user 35 of the second module 30 may have requested access to a restricted file held in the secure element 32 of the second module 30. In this case, if the second module verifies the password received at step 70 from the user 35 of the second module 30 and the user 35 supplies the correct PIN associated with the person who is allowed to access that file, then the second module 30 enables access (step 80) to that file.

The second module may, in one arrangement, store previously received passwords, and upon receiving a particular password from a user 35 of the second module 30, the second module 30 may deny access to the data requested in association with that particular password if that password has been previously received. Thus, if a user 35 attempts to replicate a previously validated OTP (which was generated by the first module 20 at some time TG), the second module 30 will reject that OTP as a replica of a previously received OTP, even if the replicated OTP is determined to have been received within the predetermined time of TG (i.e. if the user 35 replicates the validated OTP shortly after the original OTP was received by the second module 30).

As mentioned above, when the first and second modules 20, 30 are composite parts of a device 90, the first module 20 may generate passwords in dependence upon a device ID of the device 90. In this case, a user 35 of the second module 30 may be required to enter the device ID into the second module 30 along with the password. The second module 30 may then use the device ID provided by the user 35, along with the reception time TR, to determine whether the password received from the user 35 is valid. The second module 30 may also separately check whether the device ID entered by the user 35 of the second module 30 matches the device ID of the device 90. In this case, if the device ID received from the user 35 is incorrect, the second module may deny access to the requested data regardless of whether the received password is valid. Requiring the user 35 to provide the unique device ID of the device 90 increases the confidence that the user 35 of the second module 30 is in possession of the device 90. The device ID could alternatively be provided to the second module 30 by the application programming interface of the device 90. This provides some additional assurance that the second module 30 has not been stolen and replaced in a different device.

In another arrangement, rather than being configured with a clock that is synchronized with the clock of the first module 20, the second module 30 may instead have access to an alternative time source, which is external to the second module 30. As a particular example, where the first and second modules 20, 30 are composite parts of a device 90, the second module 30 may have access to a clock of the device 90, and the clock of the device 90 may be used as the time source. In this case, upon receiving a password from a user 35 of the second module, the second module 30 may obtain an untrusted time stamp (indicating the time TR at which the password was received) from the time source and may use that untrusted timestamp (along with the shared secret and optionally also a device ID received from the user 35 of the second module 30) to validate the received password as described above.

By way of clarification, an untrusted time source may be, for example, a time source that can be tampered with or altered without the second module's knowledge or a time source that provides unauthenticated timestamps which can easily be replicated. In the particular example above, the clock of the device 90 can be altered by a remote user, and is therefore not trusted by the second module 30.

In this particular arrangement, once the second module 30 has validated a received password, the second module 30 sends a message containing the timestamp used to validate the received password (i.e. the untrusted timestamp TR) to a trusted third party that has a clock synchronized with the clock of the first module 20. Trust may have been established between the third party and the second module 30 by the sharing of cryptographic keys for use in signing and thereby authenticating messages sent therebetween, as will be discussed in more detail below.

Upon receiving the message containing the untrusted timestamp, the third party determines whether the time TR indicated by the timestamp is within a predetermined range of the current time as measured by the clock of the third party. If the time TR is determined to be within the predetermined range of the current time and the message indicates that the password received by the second module 30 is valid, the third party determines to trust that the user 35 of the second module 30 is in possession of both the first and second modules 20, 30. This is because, if the second module 30 has positively validated a received password using the timestamp TR, then the user 35 of the second module 30 must have provided a password that would have been generated by the first module 20 at a time TG that is close to TR. It follows then that, if TR is close to the current time, then TG must also be close to the current time and thus it can be determined that a user 35 of the second module 30 must have provided a password that was/would have been generated by the first module 20 at some time TG close to the current time, and thus that the user 35 of the second module 30 is likely to be currently in possession of the first module 20. As there is no way to automatically transfer a password generated by the first module 20 to the second module 30, it is very likely that the person in possession of the second module 20 is also in possession of the first module 30 and can thereby transfer the password generated by the first module 20 to the second module 30 manually.

Advantageously, if the third party determines that the timestamp T-'R is not within the predetermined range of the current time, and therefore was obtained from a time source that is not synchronized with the clock of the first module 20, the third party may invoke a resynchronization procedure to resynchronize the time source.

In the present arrangement, the trusted third party then sends a message to the second module 30 which indicates whether the time TR is within the predetermined time range. If the time TR is within the predetermined time range, the second module 30 enables access to requested data. Alternatively, if the time TR is outside the predetermined time range, the second module denies access to the requested data.

The user 35 of the second module 30 may request access to data that is held externally by a trusted third party. In this case, the third party may have access to a clock that is synchronized with the clock of the first module 20, such as a clock that runs on universal time. In the case that the second module 30 has validated a password received from the user 35 of the second module 30 (using a timestamp provided by an untrusted time source external to the second module 30 as described above), the second module 30 is configured to send a request for access to data to the third party. The request contains both an indication that a password received by the second module 30 in association with a request for access to data has been validated and also a timestamp indicating the time TR (obtained from the untrusted time source) that was used to validate the password. Upon receiving the request from the second module 30, the third party determines whether the time TR is within a predetermined range of the current time, as described above, and responsively either sends the requested data to the second module 30 or denies access.

In the above examples, the second module 30 may store previously received OTPs and may invalidate any OTPs that have been previously received. This is particularly useful for situations in which the second module 30 is simultaneously accessed both by a remote user 35 and a user 35 in possession of both the first and second modules 20,30 (i.e. a local user 35). Assuming the remote user 35 attempts to access data by replicating an OTP that was previously entered into the second module 30 by the local user 35, the second module 30 will reject the replicated OTP as a duplicate. In one arrangement, the second module 30 may store a limited number of previously received OTPs and, if a particular OTP, which has been previously received by the second module 30 but which is no-longer stored by the second module 30, is replicated, the third party 100 is likely to reject that OTP because it will be associated with a timestamp that is outside the predetermined range of the current time.

As mentioned above, the message containing the timestamp used by the second module 30 to validate a received password may be signed by the second module 30 (e.g. using a cryptographic key(s) associated with the second module 30 and the third party), thereby allowing the third party to verify the origin of the message. This means that, if the remote user 35 attempts to alter a message sent by the second module 30 containing an untrusted timestamp, the third party will recognize that the message has been altered because it will not contain the second module's correct signature, and will deny access to the associated requested data. Messages that have been altered by someone other than the original sender are commonly referred to as "spoofed messages."

Further, if the trusted third party is configured to send a message to the second module 30 indicating whether a received timestamp is valid, that message may also be signed. This allows the second module 30 to identify messages sent to the second module 30 by a party other than the trusted third party, which may not be trusted.

In another arrangement, rather than obtaining a timestamp for use in validating a received password from an untrusted time source, the second module 30 may obtain a timestamp from a trusted third party that has a clock that is synchronized with the clock of the first module 20. As in the above example, the third party and the second module 30 may sign and thereby authenticate messages sent therebetween using cryptographic keys for example, and thus timestamps that are signed by the third party can be trusted by the second module 30. In one particular arrangement, upon receiving the request for access to data at step 40 from a user 35, the second module 30 may send a message to the third party requesting a timestamp, and the third party may respond by sending a message containing a timestamp indicating the time at which the request for a timestamp was received (as measured by the clock of the third party).

If the second module 30 subsequently receives a password from the user 35 of the second module 30, the second module 30 uses the received timestamp, which is assumed to indicate a time close to TG, along with the OTP generation key and optionally also a device ID received from the user 35 of the second module 30, to determine whether the received password corresponds to a password that was/would have been generated by the first module 20 at a time within a predetermined time range of the time indicated in the received timestamp.

In one arrangement, if the second module 30 determines that the received password corresponds to a password that was/would have been generated by the first module 20 at a time within the predetermined range of the time indicated in the received timestamp, the second module 30 sends a message to the third party confirming the timestamp used to validate the password, and the third party makes a determination as to whether access to the associated requested data should be allowed in dependence upon (a) whether the timestamp is within a predetermined range of the current time and (b) whether the timestamp matches the timestamp sent by the third party to the second module 30. The message may be signed by the second module 30, and upon receipt of this message, the third party may also verify whether the message is signed by the second module 30 and may deny access to any data has been requested by the second module 30 in association with a message containing a timestamp that is not signed by the second module 30.

It is possible that a remote user 35 of the second module 30 may observe an OTP entered by a user in possession of both the first and second modules 20, 30 and may also observe the timestamp received from the third party. That remote user may, at some time later, supply the second module 30 with the observed timestamp and the observed OTP. In this case, if the second module 30 does not store previously received OTPs or only stores a predetermined number of previously received OTPs for example, the second module 30 may validate the remote user's password. However, as the second module 30 then sends the timestamp used to validate the password to the third party, the third party is able to identify that timestamp as being out-of-date and will deny access to the requested data accordingly.

Figure 4:
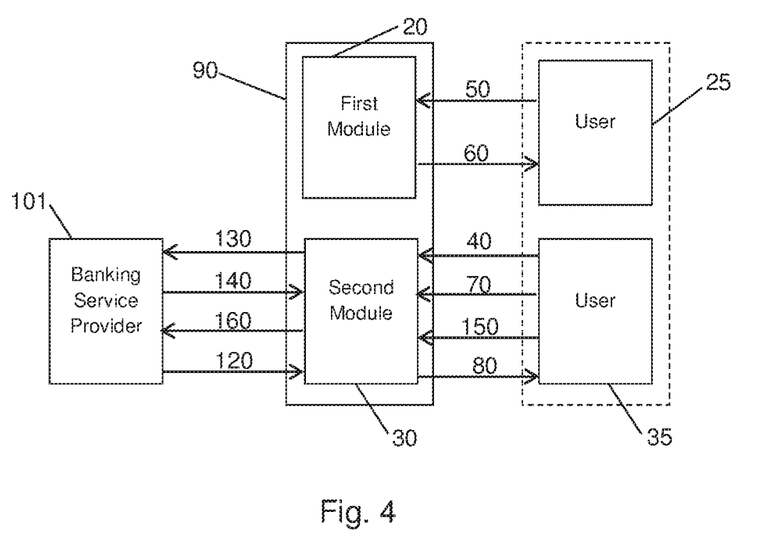
FIG. 4 shows schematically a method according to one or more embodiments of the present invention.
Figure 5:
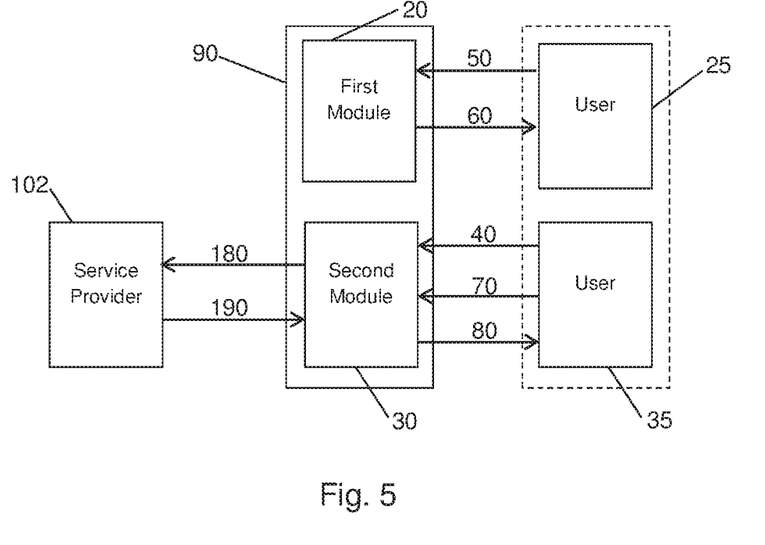
FIG. 5 shows schematically a method according to one or more embodiments of the present invention.
Figure 6:
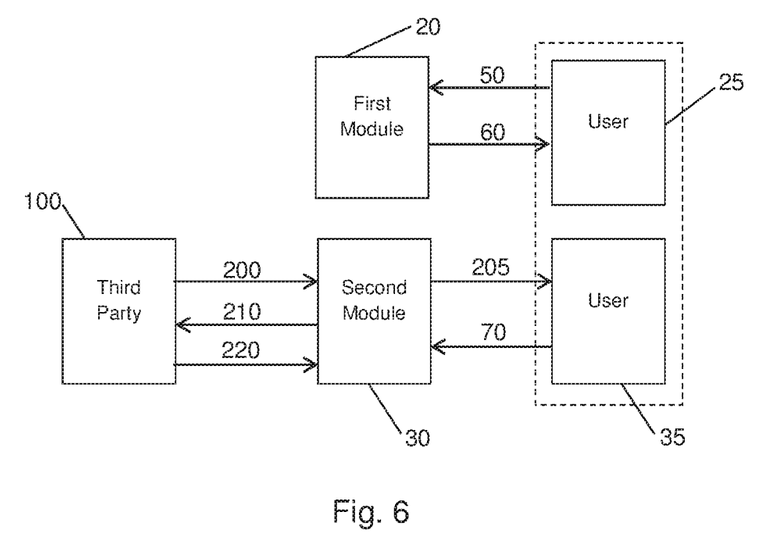
FIG. 6 shows schematically a method according to one or more embodiments of the present invention; and, FIG. 7 shows schematically a method according to one or more embodiments of the present invention.

The following description with reference to FIGS. 4 to 6 sets out a number of specific exemplary embodiments of the present invention. In the following examples, the first and second modules 20, 30 are composite parts of a device 90 and, as described above with reference to FIG. 1 for example, are for use in generating and validating OTPs respectively. The first and second modules 20, 30 are also communicatively disconnected from each other. In the following examples, the first and second modules 20, 30 share an OTP generation key that has been uniquely assigned to the first and second modules 20, 30. In each example, the first module 20 is configured to generate OTPs as a cryptographic function of the generation time (as measured by a clock of the first module 20), the OTP generation key, and a unique device identification number. In each of the following cases, the device 90 comprises two separate user interfaces 21, 31. The user interface 21 of the first module 20 comprises a button and a screen, the button being configured to cause the first module to generate a password and the screen being configured to present a generated password to a user 25 of the first module 20. The user interface 31 of the second module 30, on the other hand, comprises at least a screen and a keypad.

FIG. 4 shows schematically an exemplary method for sharing temporary cryptographic keys between a banking service provider 101 and the second module 30 of the device 90. In this example, the banking service provider 101 has shared temporary cryptographic keys with another service provider 102 (see FIG. 5) and together the cryptographic keys shared with the service provider 102 and the cryptographic keys shared with the second module 30 are for use in authenticating and/or encrypting/decrypting messages sent between the second module 30 and the service provider 102, as will be discussed in more detail below.

The second module 30 and the banking service provider 101 already have pre-assigned cryptographic keys for use in encrypting and authenticating messages sent therebetween, as discussed above. Further, the banking service provider 101 stores an association between the device 90 and a particular bank account holder.

In this example, the second module 30 does not have a clock that is synchronized with the clock of the first module 20 and the device 90 is registered with the banking service provider 101.

The banking service provider 101 has a clock that is synchronized with the clock of the first module 20 (e.g. the clock may run on universal time). In this particular example, a user 35 of the second module 30 of the device 90 requests (step 40) a temporary cryptographic key from the banking service provider 101. When requesting access to the temporary cryptographic key, the user 35 of the second module 30 may enter information into the second module 30 that identifies the particular bank account holder in respect of which the user 35 wants to obtain a temporary cryptographic key.

Upon receiving the request for a temporary cryptographic key 40, the second module 30 sends a message (step 130) to the banking service provider 101 indicating that a request for access to a temporary cryptographic key has been made by a user 35 of the device 90 and indicating that the device 90 has modules 20, 30 for generating and validating passwords. This message (sent at step 130) informs the banking service provider 101 that the device 90 is able to determine whether the request (at step 40) for access to a temporary cryptographic key originated from a user in physical possession of the device 90, and also prompts the banking service provider 101 to provide (step 140) a timestamp indicating the current time as measured by the clock of the banking service provider 101. The timestamp is signed by the banking service provider 101 and thus the second module 30 can trust that the timestamp was received from the trusted banking service provider 101 and therefore that the timestamp is trusted and was generated by a clock that is synchronized with the clock of the first module 20.

The message 130 may also identify the device 90 (and thereby the bank account holder who is associated with the device 90) to the banking service provider 101 e.g. by sending the device ID associated with the device 90 to the banking service provider 101.

After receiving the message (at step 140), the second module 30 prompts the user of the second module to enter a password that has been generated by the first module 20 of the device 90 and also the unique device ID of the device 90. In this particular example, the user 35 of the second module 30 is in possession of the device 90, and is therefore also the user 25 of the first module 20. Thus the user 25, 35 of the device 90 can press the button of the user interface of the first module 20 and cause the first module 20 to generate an OTP (step 50). The user 25 may then retrieve the generated password (step 60) from the screen of the first module 20, and may enter the retrieved password along with the device ID of the device 90 into the user interface 31 of the second module 30 (step 70).

As mentioned above, upon receipt of the message 130, the banking service provider 101 sends a signed message (step 140) containing a timestamp to the second module 30. This message 140 may also include a challenge for the user 25, 35 of the device 90. As a particular example, the message sent at step 140 may challenge the user 25, 35 of the device 90 to enter credentials (such as a username and a PIN) that have been pre-agreed between the banking service provider 101 and the bank account holder associated with the device 90. This has the advantage that the banking service provider 101 is able to verify whether the user 35 of the second module 30 is the bank account holder associated with the device 90 or whether the user 35 is a different person (who may have stolen the device 90, for example).

Upon receipt of the password and device ID from the user 35 of the second module 30 (at step 70), the second module 30 uses the timestamp within the message received at step 140 to verify the password. In the present arrangement, the second module verifies the received password by using the timestamp, the OTP generation key that has been assigned to the first and second modules 20, 30, and the device ID received from the user 35 to determine whether the received password matches any passwords that would have been generated by the first module 20 at a time TG that is equal or close to the time given in the received timestamp. The maximum time difference between the timestamp and TG for which the second module 30 will determine a received password to be valid may be set by the second module 30 or the banking service provider 101, and in this latter case, the maximum time difference may be indicated to the second module 30 in the message 140.

If the second module 30 determines that the password received from the user 35 of the second module 30 is correct, the second module 30 presents the challenge received at step 140 in the message that was sent from the banking service provider 101 to the second module 30 to the user 35 and the user 35 of the second module 30 then responds (step 150) to this challenge.

After receiving at step 150 the response to the challenge, the second module 30 sends (step 160) a signed message indicating that a received OTP was found to be valid, confirming the time used to verify that received OTP, and also containing the response to the challenge received (at step 150) from the user 35 of the second module. In this example, the response is encrypted.

If, on the other hand, the second module 30 does not successfully validate the received password, the second module 30 sends a signed message (step 160) to the banking service provider 101 indicating that the received OTP was found to be invalid. In one particular arrangement, the message sent from the second module 30 to the banking service provider 101 at step 160 contains the OTP validation result, a time stamp, and a challenge response, regardless of whether the validation result is positive or negative. This ensures that the messages sent at step 160 are indistinguishable and cannot provide a non-authorized party with additional information to launch a denial of service attack.

If the message sent at step 160 indicates that the received OTP was validated and if the time used to verify the received OTP matches the time indicated in the timestamp sent at step 140 and is within a predetermined range of the current time, then the banking service provider 101 determines whether the response to the challenge received at step 150 from the user 35 of the second module is correct. For example in the case that the challenge is a request for the user 35 to enter a PIN that has been pre-agreed between the banking service provider 101 and the identified bank account holder (who is associated with the device 90), the banking service provider 101 may determine whether the PIN entered by the user 35 of the second module 30 matches the PIN of the identified bank account holder. If the banking service provider 101 determines that the response (at 150) to the challenge is correct, the banking service provider 101 may send (step 120) the requested temporary cryptographic key to the second module 30, where it is then stored.

In an alternative embodiment, the second module 30 may be prepositioned with a secret for use in presenting a challenge to the user 35 of the second module 30. For example, the secret may be a PIN associated with the bank account holder associated with the device 90, and in this case, the second module 30 may challenge the user 35 of the second module 30 to enter that PIN. The second module 30 may then use the secret to validate the response to the challenge received from the user 35 of the second module 30 at step 150, and may indicate the result of the verification to the banking service provider 101 at step 160.

If the message sent at step 160 from the second module 30 indicates that the OTP received from the user 35 of the second module was not validated successfully or if the time used by the second module 30 is outside the predetermined range of the current time or does not match the timestamp sent at step 140, the banking service provider 101 denies access to the requested temporary cryptographic key.

In an alternative example, rather than the banking service provider 101 generating and distributing the temporary cryptographic key, the temporary cryptographic key could be generated by the service provider 102 (see FIG. 5), and sent to the banking service provider 101, which will then determine whether to share that key with the second module 30 as in the case where the temporary cryptographic key is generated by the banking service provider 101. Alternatively, the temporary cryptographic key could be generated by the second module 30, and may be sent to the banking service provider 101 in the message 130 for example. In this arrangement, the banking service provider 101 may then share that temporary cryptographic key with a service provider 102 if it determines that the user 35 of the second module 30 has correctly entered a password that was generated by the first module 20 into the second module 30.

FIG. 5 shows schematically further steps according to an embodiment of the present invention, which may be carried out by the service provider 102 and the second module 30 once the second module 30 has received the temporary cryptographic keys from the banking service provider 101. As mentioned above, the device 90 is registered with a banking service provider 101 as being owned by a particular bank account holder and the banking service provider 101 shared temporary cryptographic keys with a service provider 102, which are associated with that bank account holder. The service provider 102 may already know the bank account holder who is the registered owner of the device 90, and in this case, when the temporary cryptographic keys are shared with the service provider 102, the bank account holder that is associated with those keys is identified to the service provider 102. Alternatively, if the bank account holder is not already known by the service provider 102, the banking service provider 101 may send to the service provider 102 information for use in identifying and providing a service to that bank account holder when the associated temporary cryptographic keys are shared.

In the present example, a user 35 of the second module 30 requests (step 40) access to a server for use in making a payment or transferring funds from the account of the bank account holder associated with the device 90. In this particular example, the server is for use in facilitating a person-to-person (P2P) payment via the device 90 from the account of the bank account holder associated with the device 90. When requesting (step 40) access to the P2P server, the user 35 of the second module 30 may enter information into the second module 30 that identifies the bank account holder in respect of which the user 35 wants to obtain P2P services.

Upon receiving the request (step 40) from the user 35 of the second module 30, the second module 30 prompts the user 35 to enter an OTP generated by the first module 20 of the device 90 and also the unique device ID of the device 90. Upon receiving a password from the user 35, the second module 30 retrieves a timestamp from a clock of the device 90, indicating the time TR, as measured by this clock, at which the password was received by the second module 30. The second module then uses this timestamp, along with the OTP generation key and the device ID received from the user 35, to determine whether to verify the received password. As discussed above, the clock of the device 90 is not trusted by the second module 30 and thus in this case, if the second module 30 determines that the password received from the user 35 of the second module 30 matches the password that was/would have been generated by the first module (i.e. if the second module 30 validates the received password), the second module sends a message (step 180) to the service provider 102, which is encrypted and signed using the temporary cryptographic keys stored in the second module 30, thereby preventing the contents of the message from being discovered and enabling the service provider 102 to verify the origin of the message (i.e. enabling the service provider 102 to verify that the message has not been tampered with). The message sent at step 180 comprises: an indication that a request for access to the P2P server has been made on behalf of a particular bank account holder; an indication that the second module 30 of the device 90 has validated the password received from the user 35; and an indication of the time (as measured by a clock of the device 90) at which the password was received from the user 35 of the second module 30 (i.e. the reception time).

Upon receiving a message containing a positive validation result from the second module 30 (step 180), the service provider 102 uses the temporary cryptographic keys that were shared between the banking service provider 101 and the service provider 102 to verify whether the message is signed by the temporary cryptographic key that was shared between the banking service provider 101 and the second module 30 (i.e. the temporary cryptographic key associated with the second module 30).

If the service provider 102 determines that the message has been signed using the temporary cryptographic key associated with the second module 30, the service provider 102 then uses a clock that is synchronized with the clock of the first module 20 to determine whether the reception time is within a predetermined range of the current time. The service provider 102 may also compare the received timestamp with timestamps previously received from the second module 30. If the service provider 102 determines that the reception time is outside the predetermined time range, or that the timestamp is a duplicate of a previously received timestamp, the service provider 102 denies access to the P2P server. However, if the service provider 102 determines that the reception time is within the predetermined time range and is not a duplicate, the service provider 102 allows access to the P2P server (steps 190 and 80). As discussed above, in this embodiment using an untrusted time source to validate a received password does not present a problem because, although a remote user 35 of the second module 30 may be able to observe and replay a correct OTP-timestamp combination and thereby cause the second module 30 to validate the replayed password, the service provider 102 would reject the replayed or outdated timestamp and would deny access to the associated requested data.

FIG. 6 shows schematically an alternative embodiment of the present invention in which, rather than a request for access to data being received at the second module 30 from a user 35 of the second module 30, a request (step 200) for access to data is instead received at the second module 30 from a third party 100. In particular, in this scenario, a third party 100 wishes to determine whether there is a user 35 of the second module 30 who is in physical possession of the second module 30 and thus the third party 100 sends a message (step 200) to the second module 30 indicating same. Upon receipt of this message, the second module 30 prompts (step 205) a user 35 of the second module 30 to enter a password that has been generated by the first module 20 into the second module 30. If there happens to be a user 35 in possession of the second module 30, who is also in possession of the first module 20, then that user 25,35 can (via steps 50, 60 and 70) enter a password generated by the first module 20 into the second module 30.

Upon receipt of a password (step 70), the second module 30 uses any of the methods as outlined above with reference to FIGS. 1 to 5 to determine whether the received password corresponds to the password that was generated by the first module 20 and sends (step 210) an indication of the validation result to the third party 100. The third party will then determine whether to trust that the user 35 of the second module 30 is in possession of the second module 30 in dependence on the validation result (and optionally also additional factors as described above).

It may be that the third party wishes to verify whether a particular person is in possession of the second module 30 and in this case, the second module 30 may present a challenge to the user 35 of the second module 30 as described above with reference to FIG. 4.

The following sets out an alternative aspect of the present invention. In an exemplary embodiment according to this aspect, a device 90 comprises first and second modules 20, 30 which are communicatively disconnected from each other as in the previous embodiments described above with reference to FIG. 1, for example. In other words, the device 90 is constructed and configured such that there are no means of communicating (either directly or indirectly) between the two modules 20, 30. The first and second modules 20, 30 may be integrated within the device 90 or they may have entirely separate circuitry and components. The first module 20 is again for use in generating passwords and the second module is again for use in validating received passwords, which may be received from a user 35 of the second module 30. The first module 20 is configured with a secret and comprises circuitry and/or software that is constructed and configured to generate passwords based on the secret. However, unlike the previously described arrangements, this secret has not been uniquely assigned to the first and second modules 20, 30. In this arrangement, there may be any number of modules configured with the same secret, which may or may not include the second module 30. In a particular example, the secret may be associated with a particular person, and may be prepositioned on a number of modules held by that person, each of those modules being for use in generating passwords for use in determining (up to a reasonable level of confidence) whether a request for access to data made via one of those devices originated from a user in possession of the device 90.

As for the previously described arrangements, upon receipt of a request for access to data (step 40) from a user 35 of the second module 30, the second module 30 is configured to require that the user of the second module 30 enters a password generated by the first module 20 of the device 90.

In one arrangement, in response to receipt of an indication that a request for access to data has been made (e.g. in response to the user 25 of the first module 20 pressing a button) the first module 20 is configured to use the secret assigned to the first module 20 to generate a password and provide the generated password to a user 25 of the first module 20. In an alternative arrangement, the first module 20 may be configured to use the secret to generate passwords automatically at regular time intervals.

If the user 35 of the second module 30 is in possession of the device 90, then the user 35 is able to retrieve the password from the first module 20 (for example from a screen of the first module 20) and enter the retrieved password into the second module 30 of the device 90 (for example via a keypad of the second module 30).

The second module 30 may be one such module that is pre-provisioned with the same secret as the first module 20, and in this case, the second module 30 uses the secret to determine whether the password received from the user 35 of the second module 30 corresponds to a password that was/would have been generated by the first module 20 of the device 90 (or any other module that uses that secret to generate passwords). In this case, the second module 30 may use any of the methods as set out above (i.e. any of the methods described above with reference to FIGS. 1 to 5) to determine whether the password received from the user 35 of the second module 30 corresponds to a password that was/would have been generated by the first module 20 of the device 90. As in the arrangements described above, the secret shared between the first and second modules 20, 30 may be an OTP generation key, and the first module 20 may generate OTPs in dependence upon that OTP generation key and the current time. In this case, depending on whether the second module has a clock that is synchronized with the clock used by the first module 20 to generate the password, the second module 30 may use any of the methods as set out above.

If the second module 30 determines that the password received from the user 35 of the second module 30 corresponds to a password that was/would have been generated by the first module 20 of the device 90, the second module validates the received password.

Figure 7:
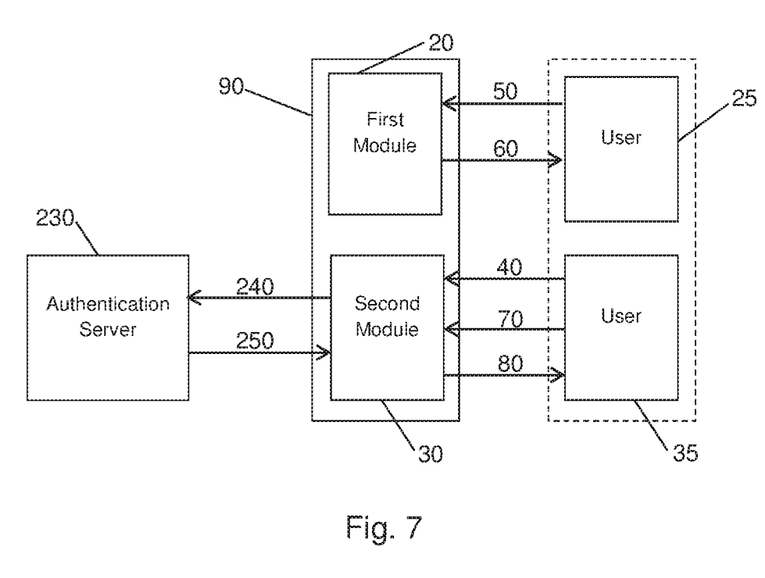

FIG. 7 shows schematically an alternative arrangement in which the secret used by the first module 20 to generate a password is not known by the second module 30, but is instead shared between an authentication server 230 and the first module 20. In this case, a user 35 of the second module 30 requests access to data (step 40), and the second module 30 then prompts the user 35 to enter a password generated by the first module of the device 90. If the user 35 of the second module 30 is in possession of the device 90 they can retrieve (step 60) a password generated by the first module 20 and enter (step 70) it into the second module 30.

In this particular arrangement, in order to determine whether to validate the received password, the second module 30 sends a message (step 240) to the authentication server 230 containing the password received from the user 35 of the second module 30. Advantageously, the message sent at step 240 may be signed by the third party 230 so that it cannot be spoofed, as discussed in detail above.

Upon receipt of the message sent at step 240, the authentication server 230 uses the secret that is shared between the authentication server and the first module 20 to determine whether the password received from the user 35 of the second module 30 corresponds to a password that was/would have been generated by the first module 20 of the device 90. As in the previous example, the secret that is shared between the authentication server 230 and the first module 20 may be an OTP generation key, and the first module 20 may be configured to generate OTPs in dependence upon the current time (as measured by a clock of the first module) and the OTP generation key. In this case, the authentication server may have a clock that is synchronized with the clock of the first module 20 for use in validating received passwords.

In one particular arrangement, the secret that is shared between the authentication server 230 and the first module 20 is associated with a particular person, and the authentication server stores an association between that particular person and the secret. In this case, the message sent at step 240 containing the password received from the user 35 of the second module 30 also contains information that uniquely identifies the person associated with the secret to the authentication server. The authentication server 230 may hold many secrets, each being associated with a different person, and thus the message 240 enables the authentication server 230 to determine which secret to use to determine whether the password received from the user 35 of the second module 30 corresponds to a password that was/would have been generated by the first module 20 of the device 90.

In this case, if the authentication server 230 determines that the password received from the user 35 of the second module 30 corresponds to a password that was/would have been generated by the first module 20, the authentication server 230 sends a message (step 250) to the second module 30 indicating that the password received from the user 35 of the second module 30 is valid, and upon receipt of this message, the second module validates the received password.

On the other hand, if the authentication server 230 determines that the password received from the user 35 of the second module 30 does not correspond to a password that was/would have been generated by the first module 20, the authentication server 230 sends a message (step 250) to the second module 30 indicating that the password received from the user 35 of the second module 30 is not valid, and the second module invalidates the received password.

The secret that is shared between the authentication server 230 and the first module 20 may alternatively be associated with the first module 20 only and the authentication server 230 may store an association between the first module 20 (or the device 90 of which the first module 20 is a component) and the secret. In this case, the message sent at step 240 containing the password received from the user 35 of the second module 30 may also contain information (e.g. the unique device ID) that uniquely identifies the device 90.

Advantageously, the message sent at step 250 may be signed by the third party 230 so that it cannot be spoofed, as discussed in detail above.

In an alternative arrangement, upon receiving a password from a user 35 of the second module 30, the second module 30 may validate that password by retrieving a password from a third module that is configured with the same secret as the first module 20. In this case, the second module may prompt the third module to generate a password using that secret. The second module may then compare the password generated by the third module to the password received from the user 35 of the second module 30, and may validate the password received from the user 35 if there is correspondence.

In the alternative arrangements above, in which the first and second modules 20, 30 are composite parts of the same device 90 and are communicatively disconnected from each other within that device 90, the only (realistically likely) way a user 35 of the second module 30 is able to retrieve a password from the first module 20 and enter it into the second module 30, is if the user 35 of the second module is in possession of the first module 20. It follows therefore that in this case, the user 25 of the first module is very likely to be in possession of the device 90 and is therefore a human user. Thus, if the second module validates the password received from the user 35 of the second module 30, the second module can determine up to a very high level of confidence that the request for access to data originated from a human who is in possession of the device 90 (and is therefore not a remote entity), and can thus enable access to the requested data. Enabling access to the requested data may include allowing access to restricted data held on the device 90 or, in the case that the requested data is held by a third party, it may include sending data to the third party for use in enabling access to the requested data.

Advantageously, in any of the above embodiments, in the case that messages are sent between the second module 30 and a third party, each of those messages is encrypted. Thus, if the messages are intercepted, the information contained therein cannot be extracted and thereby compromised. It will be understood that, if the messages are also signed, the order in which the message is encrypted and signed will depend on the particular cryptographic algorithm used and that in general, the encryption and signing may be applied to the message separately or in combination. The above embodiments are to be understood as illustrative examples of the invention. Further embodiments of the invention are envisaged. For example, the second module 30 may be for use in enabling access to data, assets or services held or supplied by a plurality of third parties 100. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A device for use in verifying a request for access to data, comprising:
    a first circuit arranged to generate a password associated with a request for data, the first circuit comprising a first user interface arranged to output the generated password to a human in possession of the first circuit; and
    a second circuit comprising a second user interface enabling the human in possession of the second circuit to input the password associated with the request for data generated by the first circuit, the second circuit being arranged to validate the input password and to enable access to the requested data when the second circuit validates the password,
    wherein the first circuit is arranged to generate the password in dependence upon a one-time password generation key and said second circuit being is arranged to validate the password, and
    wherein the first circuit is communicatively disconnected from the second circuit, and does not share common communication circuitry or communication interfaces.

2. The device according to claim 1, wherein said second circuit is arranged to validate the password in dependence on the one-time password generation key.

3. The device according to claim 1, wherein the second circuit is arranged to send the password to an authentication server for validation.

4. The device according to claim 1, wherein said device has a unique device identifier and said generated and received passwords are generated and validated in dependence upon the unique device identifier.

5. The device according to claim 1, wherein the second circuit is arranged to send data for use in enabling access to the requested data, whereby to enable access to the requested data.

6. The device according to claim 1, wherein the first circuit is arranged to generate said generated password in response to an input related to said request for access to data.

7. The device according to claim 6, wherein the first circuit is arranged to generate a subsequent password in response to a subsequent input related to a subsequent request for access to data, the subsequently generated password being different from a previously generated password.

8. The device according to claim 1, wherein the first circuit is arranged to generate a plurality of passwords, at least one password of the plurality of passwords being different from another password of the plurality of passwords, and to provide at least one of the generated passwords to a user via an interface of the first circuit.

9. The device according to claim 8, wherein said passwords are generated in dependence upon at least said one-time password generation key and a current time.

10. The device according to claim 1, wherein the first circuit comprises a first clock for use in generating a password and the second circuit comprises a second clock for use in validating a received password, the first and second clocks being synchronised.

11. The device according to claim 1, wherein the first circuit comprises a clock for use in generating a password and the second circuit is arranged to receive a timestamp for use in validating a received password, the timestamp being received from a third party that has a clock that is synchronised with the clock of the first circuit.

12. The device according to claim 1, wherein the second user interface is arranged to receive the request for access to data from a user of the human in possession of the second circuit via that user interface.

13. The device according to claim 12, wherein the second circuit is further arranged to receive information via the user interface of the second circuit that uniquely identifies the human, and said data sent by the second circuit for use in enabling access to data comprises data that uniquely identifies said human.

14. The device according to claim 1, further comprising a battery, wherein the first circuit and the second circuit are integrated within the device, and share and are powered by the battery.

15. The device according to claim 1, wherein the device is a wireless device.

16. A method of verifying a request for access to data, the method comprising:

generating, by a first circuit of a device, a password and outputting the generated password via an interface of the first circuit to a human in possession of the device;

receiving, by a second circuit of the device, a password associated with the request for data from the human in possession of the device via an interface of the second circuit, said received password corresponding to the password generated by the first circuit;

validating at the second circuit said received password; and enabling access to the requested data at the second circuit, wherein the first circuit generates the password in dependence on a one-time password generation key, and wherein the first circuit is communicatively disconnected from the second circuit, and does not share common communication circuitry or communication interfaces.

17. The method of claim 16, wherein the second circuit validates the received password in dependence on the one-time password generation key.

18. The method of claim 16, wherein the second circuit sends the received password to an authentication server for validation.

19. The method of claim 16, wherein the device is a wireless device.

20. The method of claim 16, wherein the first circuit and the second circuit are powered by a common battery.

21. The method of claim 16, wherein the first circuit and the second circuit are integrated within the device and share a battery.

* * * * *

UNITED STATES PATENT AND TRADEMARK OFFICE
CERTIFICATE OF CORRECTION

PATENT NO.        : 10,929,524 B2
APPLICATION NO.   : 16/357098
DATED             : February 23, 2021
INVENTOR(S)       : Boris Taratine et al.

It is certified that error appears in the above-identified patent and that said Letters Patent is hereby corrected as shown below:

In the Claims

Column 23, Lines 54-55, please remove "for use in verifying a request for access to data"; and Column 24, Line 52, remove "a user of".

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*